United States Patent [19]

Shirai et al.

[11] Patent Number: 4,935,729
[45] Date of Patent: Jun. 19, 1990

[54] APPARATUS FOR CONTROLLING THE STORAGE AND DISPLAY OF INFORMATION ON A DISPLAY DEVICE

[75] Inventors: Junichi Shirai; Masayuki Ishizuka; Norihito Fukuki, all of Osaka, Japan

[73] Assignee: Sanyo Electric Co., Ltd., Osaka, Japan

[21] Appl. No.: 131,265

[22] Filed: Dec. 9, 1987

Related U.S. Application Data

[63] Continuation of Ser. No. 718,072, Apr. 1, 1985.

[30] Foreign Application Priority Data

Apr. 5, 1984 [JP] Japan ................................. 59-68717

[51] Int. Cl.⁵ ............................................. G09G 106
[52] U.S. Cl. .................................... 340/721; 340/723; 340/724
[58] Field of Search ............... 340/706, 709, 710, 721, 340/723, 724

[56] References Cited

U.S. PATENT DOCUMENTS 3,911,419 10/1975 Bates et al. .......................... 340/709
3,974,493 8/1976 de Cavaignac et al. ............. 340/709
4,354,185 10/1982 Worborschil ........................ 340/709
4,454,507 1/1984 Srinivasan et al. .................. 340/709

Primary Examiner—David K. Moore
Assistant Examiner—Richard Hjerpe
Attorney, Agent, or Firm—Darby & Darby

[57] ABSTRACT

A displaying apparatus comprises a CRT capable of displaying picture elements of n rows by m columns and a VRAM (Video RAM). The VRAM comprises a CRT area having addresses of n rows by m columns identical to those of the CRT and a first and a second menu areas formed at both right and left sides of this CRT area. Display data of a formatted document is stored in the CRT area, being converted into a video signal to display an image of the formatted document by means of the CRT. To point a blank space of the formatted document, as cursor is further displayed on the CRT. When a menu display is required, the data of the required menu is stored in the first and the second menu areas, being converted into a video signal. A CPU decides the leading address of the VRAM to start the display so that the cursor and the menu are displayed simultaneously on the CRT screen. Thus, an erasure of the cursor from the CRT screen can be prevented even when the menu is displayed.

21 Claims, 11 Drawing Sheets

FIG. 1

PRIOR ART

FIG. 2

PRIOR ART

ENDLESS STRUCTURE

APPARATUS FOR CONTROLLING THE STORAGE AND DISPLAY OF INFORMATION ON A DISPLAY DEVICE

This is a continuation of application Ser. No. 718,072, filed Apr. 1, 1985.

BACKGROUND OF THE INVENTION

1. Field of the Invention

The present invention relates to a displaying apparatus. More specifically, the present invention relates to a displaying apparatus which employs a display, for example, a CRT, and can be utilized advantageously, for example, for performing word processing, serving as a work station for a Local Area Network (LAN), etc.

2. Description of the Prior Art

Recently, studies on putting the LAN (Local Area Network) into practical use have been carried out. A data processing apparatus called a work station is connected to the LAN. Functions of the work station proposed at present include preparation of the formatted or non-formatted document, filing of documents, electronic mail and the like.

Figure 1:
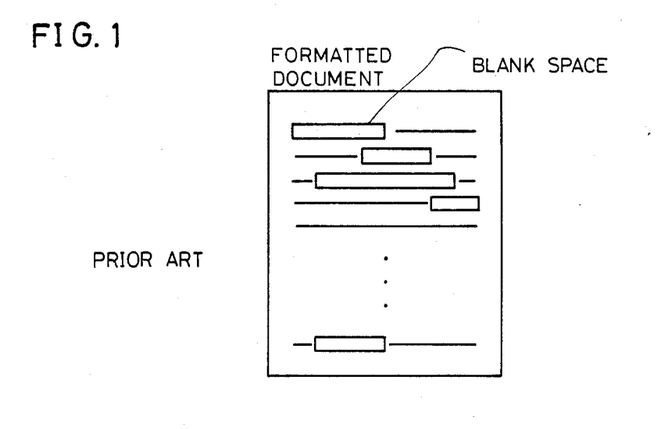
FIG. 1 is an illustrative view showing one example of an image of a formatted document having a plurality of blank spaces.

A formatted document can be completed, for example, by using a pattern as shown in FIG. 1 wherein some blank spaces are determined in advance and writing data or information to the blank spaces of this pattern. Then, the methods for writing data or information to such blank spaces include the method of employing the normal word processing function and the method of employing the menu.

Figure 2:
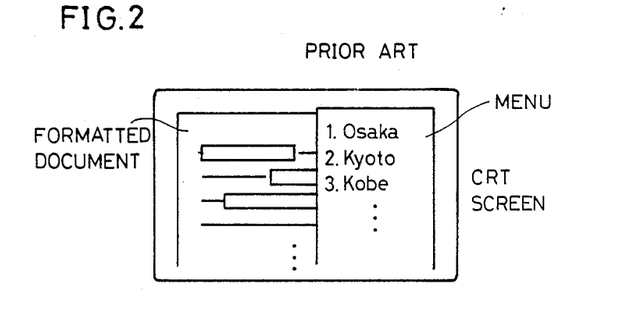
FIG. 2 is an illustrative view showing a state wherein a formatted document and a menu are displayed simultaneously on a CRT screen.

In the method of employing the menu, as shown in FIG. 2, an image of the formatted document is displayed on a CRT screen and also a menu is displayed while superposed on this image. Required information or data is selected from among these menus, and written into a blank space specified by a cursor on the CRT screen. The "menu" is a list of information or data frequently used, such as address, name, idiom and the like which are registered in advance while divided on a similar basis, and selection can be made properly from among such divided sections.

When a formatted document is prepared by using such a menu, as shown in FIG. 2, the menu is displayed while superposed on the image of the formatted document. This creates a condition causing erasure of the cursor indicating the blank space where the information selected from the menu is to be written on the CRT screen. Such cursor erasure is dependent upon the position where the menu is displayed. Such an erasure of the cursor creates a serious operational problem, in that an operator can not find the position where the information selected from the menu is to be written.

SUMMARY OF THE INVENTION

Therefore, the principal object of the present invention is to provide a displaying apparatus wherein the cursor in the image of the formatted document on the display screen is never erased, even when the menu display is performed.

In summation, the present invention is a displaying apparatus including a display having display addresses of n rows by m columns, a memory means for storing the display data to be given to this display, a document area having addresses of n rows by m columns, a menu area which is adjacent to the document area and has addresses of n rows by k columns formed in the document area, and means for determining the start address or leading address of the memory means so that the cursor and the menu are displayed simultaneously on the display.

In accordance with the present invention, no cursor is erased from the screen even when the document and the menu are displayed simultaneously on the display screen, whereby the positioning for the data to be entered is facilitated. Then, by applying any one of embodiments in accordance with the present invention, an erasure of the cursor can be prevented independent of the type of memory means (for example, VRAM).

These objects and other objects, features, aspects and advantages of the present invention will become more apparent from the following detailed description of the embodiments of the present invention when taken in conjunction with accompanying drawings.

DESCRIPTION OF PREFERRED EMBODIMENTS

Figure 3:
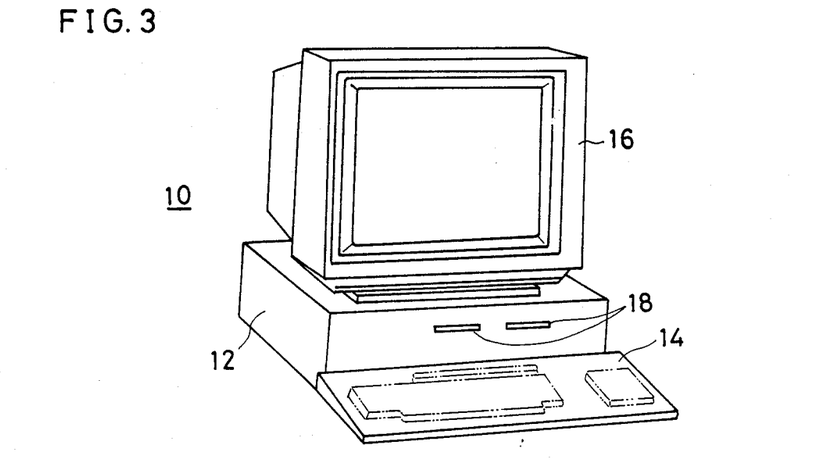
FIG. 3 is a perspective view showing an external appearance of one embodiment in accordance with the present invention.
Figure 4:
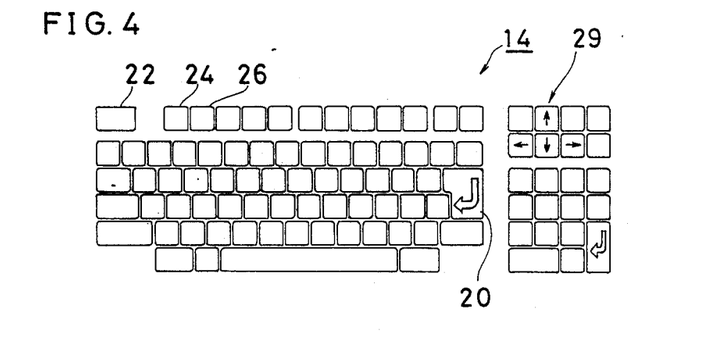
FIG. 4 is an illustrative view showing one example of a keyboard.

FIG. 3 is a perspective external appearance view showing one example of a work station of one embodiment of the present invention. A work station 10 comprises a main unit 12 accommodating components such as a CPU and the like, and a keyboard 14 as one example of an entry means, and a CRT 16 as one example of a display means are connected to the main unit 12. A disk drive unit 18, for driving a floppy disk as an external memory means, is incorporated in the main unit 12. The keyboard 14 has, for example, an arrangement of keys as shown in FIG. 4, comprising a return key 20, an end key 22 and function keys 24 and 26, in addition to alphanumeric keys. The keyboard 14 further comprises a cursor moving key 29 for moving the cursor displayed on the CRT 16 (not illustrated) up and down and right and left. The arrangement of the keyboard 14 can be varied as required.

Figure 5:
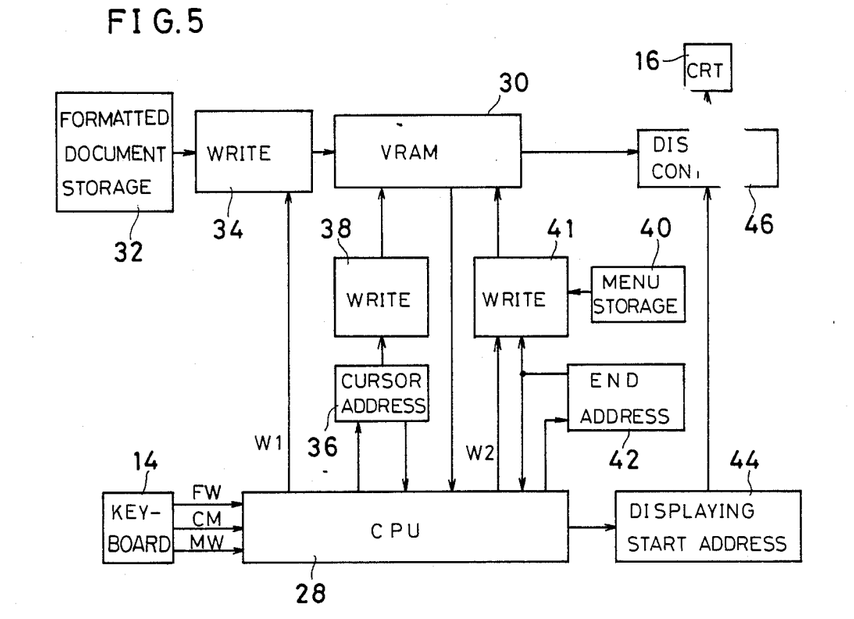
FIG. 5 is a conceptual or functional block diagram for explaining one embodiment in accordance with the present invention.

FIG. 5 is a conceptual or functional block diagram of one embodiment in accordance with the present invention. The keyboard 14 is connected to a CPU 28, and signals FW, CW and MW are inputted to the CPU 28 through this keyboard 14. The signal FW produced by operating the function key 24 acts as a command signal for reading a pattern of a formatted document from a formatted document storage 32. The signal MW generated in response to operation of the function key 26, acts as a command signal for reading a menu from a menu storage 40. The signal CM generated in response to operation of the cursor moving key 29 acts as a signal for moving the cursor displayed on the screen of the CRT 16, namely, a signal of commanding a change of the cursor address. The CPU 28 controls the entire operation of this system 10 in response to these signals FW, CM and MW or other entered data and signals.

Figure 6A:
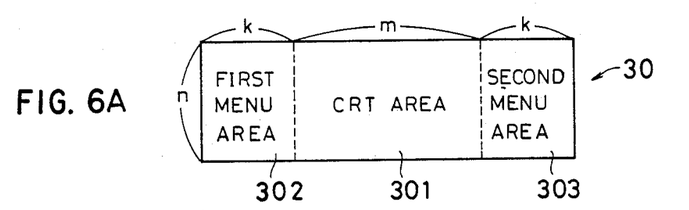
FIGS. 6A, 6B, and 6C are illustrative views showing one example of a memory map of VRAM.
Figure 6B:
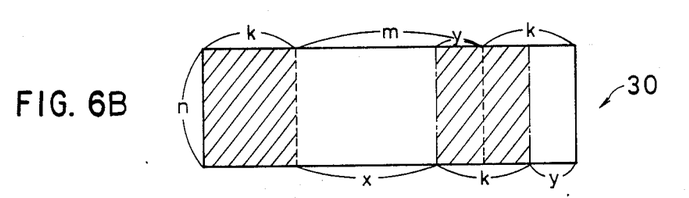
Figure 6C:
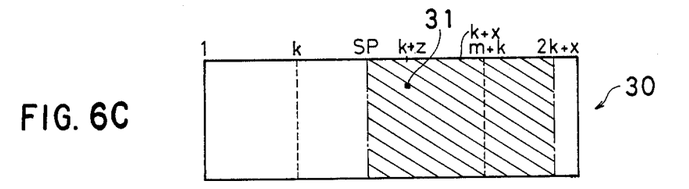

The formatted document storage 32 includes a RAM loaded with one or two pattern data of the formatted document as selected from a floppy disk inserted in the disk drive unit 18 (FIG. 3). Similarly, the menu storage 40 comprises a RAM for storing menu data loaded selectively from the floppy disk. When the CPU 28 outputs a write command signal W1 in response to the signal FW, a write circuit 34 reads data of the formatted document from the formatted document storage 32, writing it to a CRT region 301 (FIGS. 6A, 6B, and 6C, also referred to collectively as FIG. 6) of a VRAM 30. When the CPU 28 outputs a write command signal W2 in response to the signal MW, a write circuit 42 reads the menu data from the menu storage 40, writing it to a first menu area 302 and a second menu area 303 of the VRAM 30 (FIG. 6).

The CRT 16 has an arrangement of picture elements of n rows by m columns (m and n are positive integers) on the screen thereof, and this CRT 16 displays display data stored in the VRAM 30. As shown in FIG. 6A, the VRAM 30 accordingly comprises the CRT area 301 having addresses of n rows by m columns likewise the CRT 16. The VRAM 30 further comprises the first and the second menu areas 302 and 303 formed at right and left sides of the CRT area 301. The menu areas 302 and 303 have an arrangement of n rows by k columns (where k is a positive integer), respectively.

On the screen of the CRT 16, the image of the formatted document as shown in FIG. 1 is displayed, and also the cursor for indicating any one of a plurality of blank spaces contained in this formatted document image is displayed. The address for displaying such a cursor is stored in a cursor address register 36. The cursor is displayed together with the formatted document image on the screen of the CRT 16 by writing the address data from the cursor address register 36 to the CRT area 301 of the VRAM 30 by means of the writing circuit 38.

Like the cursor address register 36, and an end address register 42 are formed in a predetermined area of the RAM (not illustrated). The address of the right end column in the YRAM 30 of the formatted document data written to the CRT area 301 of the VRAM 30 is stored in the end address register 42. Such an end address is detected by the CPU 28 when the formatted document pattern data are written to the VRAM 30 from the formatted document storage 32, and the end address is stored in the register 42 by the CPU 28.

The display data stored in the VRAM 30 is displayed on the screen of the CRT 16 under the control of a display controller 46. At this time, the CPU 28 determines the leading address to be displayed of the display data stored in the VRAM 30 based on the address data stored in a pointer register 44. The display controller 46 reads the display data in sequence from the address thereof in the VRAM 30 based on the data of the start address from the pointer register 44, displaying them on the screen of the CRT 16.

As described above, writing of the menu to the VRAM 30 from the menu storage 40 is performed by the write circuit 42 and the write area thereof is the area in the VRAM 30 which is in the right side from the right end column (end address) of the formatted document. And, the width, that is, the length in the direction of row of the menu written to this area is "k". More specifically, as shown in FIG. 6B, assuming that the width, that is, the length in the direction of row of the formatted document stored in the CRT area 301 of the VRAM 30 is "m-y", the menu is written to the area hatched by slant lines in this FIG. 6B.

Note that FIG. 5 is a functional block diagram, and therefore actually the respective write circuits 34, 38 and 42 are not presented as hardware.

Next, the operation of the present embodiment based on FIG. 5 and FIG. 6 will be described. The CPU 28 outputs the write signal W1 to the write circuit 34 when the formatted document write signal FW from the keyboard 14 is inputted. In response, one formatted document pattern data is written to the CRT area 301 of the VRAM 30 from the formatted document storage 32. At this time, the CPU 28 detects the address of the right end column, namely, the end address of the formatted document written to the CRT area 301, storing the address data thereof in the end address register 42.

In addition, the CPU 28 outputs a signal to the cursor address register 36 in response to the signal CM from the keyboard 14. Therefore, the pattern data of the cursor is written to the CRT area of the VRAM 30 addressed by the cursor address register 36.

Furthermore, when the signal MW is outputted from the keyboard 14, the CPU 28 reads the data of the end address from the end address register 42, and sends it to the write circuit 42 together with the write signal W2. The write circuit 42 writes the menu loaded in the menu storage 40 to the area immediately right from the right end column of the formatted document stored in the VRAM 30 and the first menu area 302, with reference to the end address to be obtained.

Next, the CPU 28 determines the leading address, that is, the pointer address of the display data in the VRAM 30 to be displayed on the screen of the CRT 16, based on the address data of the cursor address register 36 and the address data of the end address register 42.

For example, a further detailed description will now be made with reference to FIG. 6. In FIG. 6A, assuming that the left end column of the VRAM 30 is an original point, namely, "1", the end column address of the first menu area 302 is "k", and the CRT area 301 starts with the column address "k+1" and ends with the column address "k+m", and the second menu area 303 ranges from the column "k+m+1" to the column "2k+m", that is, the end column. As shown in FIG. 6C, assuming that the right end column, namely, the end address of the formatted document written to the CRT area 301 is "k+x", and also the column address of the cursor 31 is "k+z", the menu is written to the right side from the column address "k+x+1". The right end column address thereof is "2k+x".

The display start address is determined by selecting a value of the pointer SP for displaying a cursor 31 and either of the right and left menus simultaneously on the screen of the CRT 16. Accordingly, in FIG. 6C, if the menu at the right side from the formatted document is displayed, the address which is "k+m" columns left from the column "2k+x", namely, the column "k−m−x" becomes the leading address, namely, the value of the pointer SP.

Figure 7:
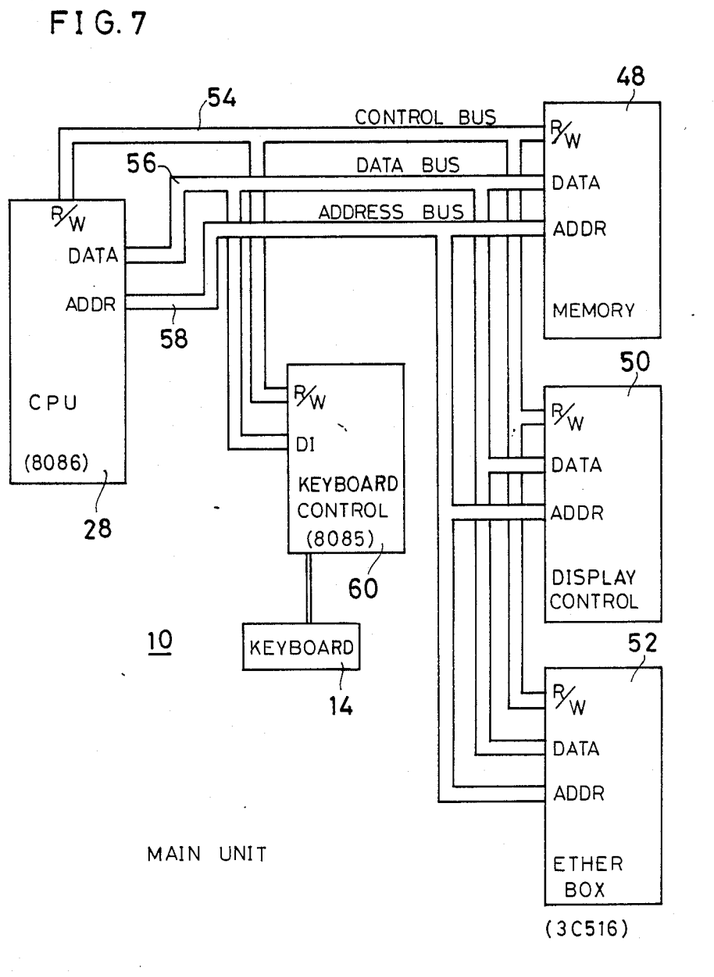
FIG. 7 is a schematic block diagram showing a hardware configuration of one embodiment in accordance with the present invention.
Figure 8:
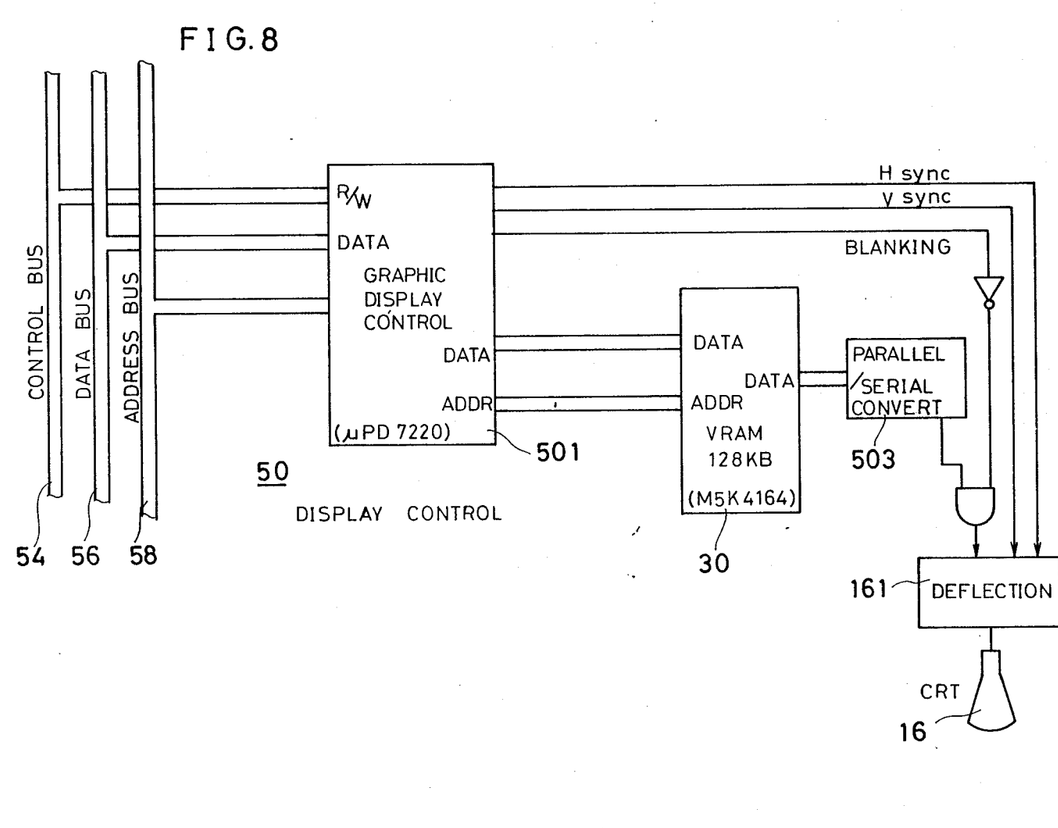
FIG. 8 is a block diagram showing one example of a display controller in FIG. 7.

FIG. 7 is a schematic block diagram showing one example of a hardware configuration of one embodiment in accordance with the present invention. This system 10 comprises the CPU 28 similar to the previous conceptual view in FIG. 5. CPU 28 can be provided, for example, by the integrated circuit "8086" manufactured by Intel. Also, the system 10 comprises a memory board 48, a display controller board 50 and an Ether box 52. The Ether box 52 can be constituted, for example, with the unit board "3C516" manufactured by 3COM. The memory board 48, though not illustrated, comprises a ROM storing the control program of this system and a RAM having a storing area equivalent to the formatted document storage 32 and the menu storage 40, and the respective registers 36, 42 and 44 of FIG. 5. The integrated circuit "2764" manufactured by Intel can be used as the ROM, and the integrated circuit "M5K4164" manufactured by Mitsubishi is available for the RAM. The display controller board 50 comprises a circuit configuration equivalent to the display controller 46 in FIG. 5, and more specifically, it has a circuit configuration as shown in FIG. 8. The Ether box 52 is used in the case where the work station 10 is connected to the Ethernet of the LAN. If the system is constituted as a stand-alone type, the Ether box 52 can be dispensed with. The CPU 28 and the memory board 48, and the display controller board 50 and the Ether box 52 are connected through a control bus 54, a data bus 56, and an address bus 58, respectively.

A keyboard controller 60 is associated with the keyboard 14. Also, keyboard controller 60 is connected to the control bus 54 and the data bus 56. The keyboard controller 60, for example, can be provided by the integrated circuit "8085" manufactured by Intel. Also, the CRT 16 is connected to the display controller board 50.

FIG. 8 shows the detail of the display controller board 50. The display controller board 50 comprises a graphic display controller 501. The graphic display controller 501, for example, can be provided the integrated circuit "μPD7220" manufactured by NEC can be utilized. The graphic display controller 501 converts the character code from the data bus into the font code responding to the character code, and outputs it to the VRAM 30. For this purpose, a port for outputting the data from the graphic display controller 501 is connected to the data input port of the VRAM 30. Thus, the display data from the graphic display controller 501 is stored in the VRAM 30. The VRAM 30 can be provided by the integrated circuit "M5K4164" manufactured by Mitsubishi.

The data outputted from the VRAM is converted into bit serial data through a parallel-serial converter 503. This display data from the parallel-serial converter 503 is processed together with the blanking signal from the graphic display controller 501, and outputted to a deflection circuit 161 as a video signal. A horizontal synchronous signal Hsync and a vertical synchronous signal Vsync, which are outputted from the graphic display controller 501, are coupled to the deflection circuit 161 of the CRT 16.

Figure 9:
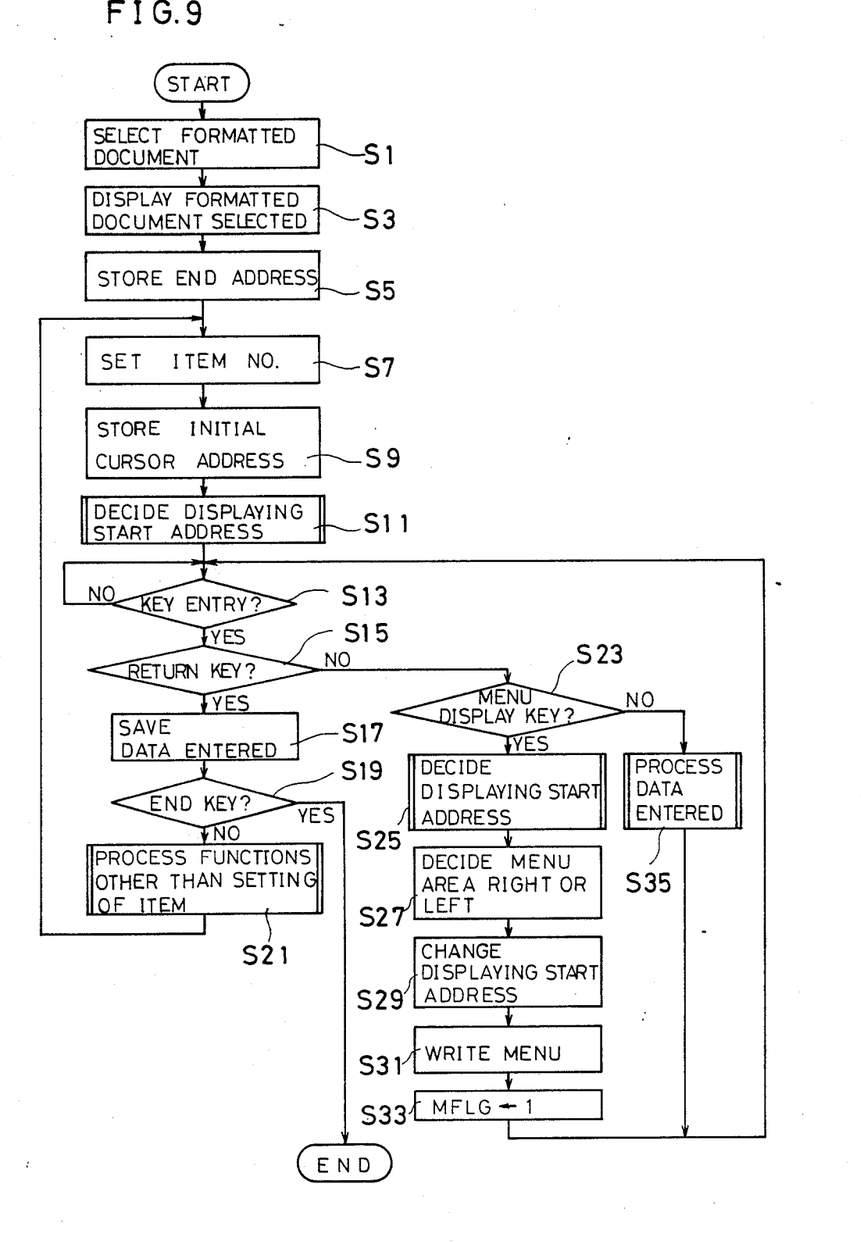
FIG. 9 is a flowchart for explaining operation of an embodiment as shown in FIG. 7 and FIG. 8.

Next, description is made on operation of the embodiment shown in FIG. 7 and FIG. 8 with reference to FIG. 9. In the first step S1, the operator operates the function key 24 and other proper keys on the keyboard 14 (FIG. 4) to select a formatted document. Then, the formatted document is selected from a floppy disk (not illustrated), and loaded into a predetermined area of the RAM contained in the memory board 48. In the next step S3, the formatted document selected is displayed on the screen of the CRT 16. For this purpose, the pattern data of the formatted document selected is transferred to the graphic display controller 501, contained in the display controller board 50, from the RAM of the memory board 48 through the data bus 56. In response, the graphic display controller 501 converts the given character data or pattern data into the font data for display in cooperation with the CPU 28, and stores the font data in the CRT area 301 of the VRAM 30 (FIG. 6). Accordingly, the image of the formatted document selected is displayed on the screen of the CRT 16 via display data from the VRAM 30.

In writing the display data to the VRAM 30 from the graphic display controller 501, as described above, the CPU 28 detects the address of the right end column of the CRT area 301 of the VRAM 30 where in which the formatted document is or stored. Then, in step S5, this address of the right end column is stored as the end address in an area equivalent to a predetermined area of the RAM, that is, the end address register 42 in FIG. 5.

In the following step S7, when the operator selectively sets any one of blank spaces in the formatted document as shown in FIG. 1, in the next step S9 the CPU 28 reads the initial position peculiar to the cursor, that is, the cursor address corresponding to the set item number from the RAM of the memory board 48, storing it in a predetermined area of the RAM equivalent to the cursor address register 36 in FIG. 5. The cursor address peculiar to each item (blank space) in such a formatted document is simultaneously stored in the RAM when the formatted document data is read from the floppy disk to the RAM. Next, this step for storing the cursor address is executed. For example, every time the cursor moving key 29 (FIG. 4) is operated to move the cursor in the step S7, the cursor address is stored.

In the next step S11, the CPU 28 determines the display start address in the VRAM 30, that is, the value of the pointer SP. A detailed description is made below for step S11.

In the step S11, when the start address, namely, the value of the pointer SP is determined, the CPU 28 is put in a state of waiting an input.

When the key entry is detected in the step S13, the CPU 28 decides whether or not the key entry has come from the return key 20 (FIG. 4) in the next step S15. Such a decision on the kind of the key can be achieved by checking the data from the keyboard controller 60. When the return key 20 is operated, in the step S17 the CPU 28 saves the data entered in step 35, as described below for the item set in the previous step S7. Subsequently, in the step S19, the CPU 28 decides whether or not the end key 22 (FIG. 4) has been operated. If this end key 22 has been operated, the processing for the formatted document is considered to be completed, and the routine in FIG. 9 ends. If any key other than the end key has been operated, the CPU 28 executes the processing corresponding to the key which has been operated in the step S21, and the processing returns again to the step S7.

When the CPU 28 detects any key entry other than the return key 20 (FIG. 4) in the previous step S15, the CPU 28 decides whether or not it is the menu display key, namely, the function key 26 (FIG. 4) in the step S23.

If the menu display key 26 has been operated, the CPU 28 determines the display start address of the VRAM 30, that is, the value of the pointer SP in the following step S25. A detailed description is given below for step S25.

When the start address is determined in step S25, in the following step S27, the CPU 28 determines the area of the VRAM 30 in which the data of the menu loaded in the area of the RAM of the memory board corresponding to the menu storage 40 (FIG. 5) is to be written. In other words, in step S27, the write area of the menu pattern is determined based on the end address stored in the previous step S5. When the menu display is commanded anew, when the menu is renewed, or when the cursor position in the formatted document is changed, the CPU 28 changes the display start address of the VRAM 30, namely, the value of the pointer SP in response to such a change in the step S29. In step S31, the CPU 28 writes the menu from the menu storage of the RAM to the menu write area obtained in the previous step S27, and also sets to "1" a menu flag MFLG formed in a predetermined area of the RAM in the step S33. The graphic display controller 501 (FIG. 8) is utilized also in writing this menu.

When the CPU 28 decides that the key operated at that time is neither the return key 20 nor the menu display key 26 in the previous step S23, processing of the entered data is performed in step S35. If the entered data is the data for the write area of the formatted document, that is, for the blank space, the CPU 28 automatically moves the cursor to the next required write area in this processing. This can be achieved by changing the address data stored in a predetermined area of the RAM in the memory board 48 equivalent to the cursor address register 36 in FIG. 5.

Figure 10:
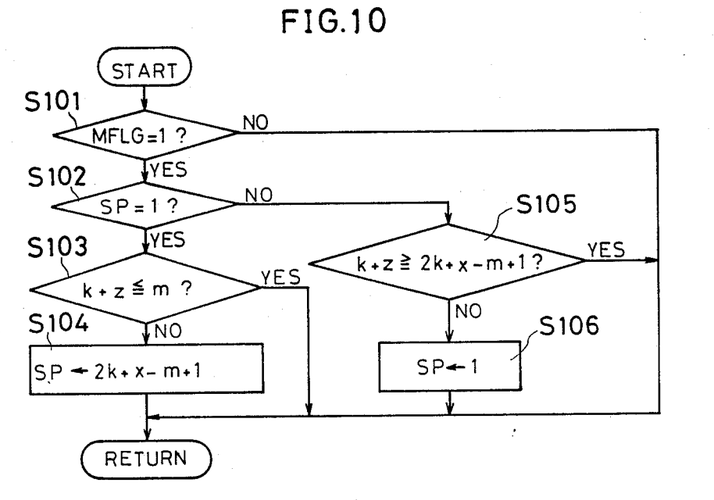
FIG. 10 and FIG. 11 are flowcharts showing one example of a subroutine for determining the display start address in the case of the VRAM having the memory map as shown in FIG. 6.

Next, the start address determining subroutine in the step S11 in FIG. 9 will be described with reference to FIG. 10 and FIG. 6. In the first step S101 in FIG. 10, the CPU 28 decides whether or not the menu flag MFLG is "1". If the menu display has been already commanded, that is, the menu display key 26 has been operated in the previous step S23 in FIG. 9, this flag MFLG is "1", and processing proceeds to the following step S102. In this step S102, the CPU 28 decides whether or not the display start address set at that time, namely, the value of the pointer SP is "1". That is, in the step S102, the CPU 28 decides whether or not the left end column address of the VRAM 30 as shown in FIG. 6, that is, "1" is set as the pointer SP.

If "SP=1" holds, the CPU 28 decides "k+z≦m?" in the following step S103. Here, as described previously, "k" is the width, namely, the length in the direction of the row of the menu data; "z" is the address in the direction of the row, namely, the column address of the cursor 31 as shown in FIG. 6(C); and "m" is the length in the direction of the row of the CRT area 301 of the VRAM 30. Accordingly, in this step S103, when the pointer SP is set to "1", the CPU 28 is to decide whether or not the menu data and the cursor are accommodated within the length in the direction of row in the CRT area 301, that is, the length in the horizontal direction on the screen of the CRT 16.

If "YES" is decided in the step S103, "1" is kept intact as the start address, that is, the value of the pointer SP. Contrariwise, if "NO" is decided, the CPU 28 sets "2k+x−m+1" as the start address, that is, the value of the pointer SP in the step S104. This column address "2k+x−m+1" is the position of the pointer SP as shown in FIG. 6(C). That is, in the case of FIG. 6(C), the length in the direction of row, that is, the column address of a total of the menu data and the formatted document data of the VRAM 30 is "2k+x". Since the width of the formatted document data is "m", the column address "2k+x−m" plus "1" is set as the start address.

If it is detected that the pointer SP at that time is not "1" in the step S102, the CPU 28 decides whether or not "k+z≧2k+x−m+1" holds in the step S105. In step S105, the CPU 28 decides whether or not the cursor address "k+z" in FIG. 6(C) is located at the right side from the start address, that is, the pointer SP. Accordingly, if "YES" is decided in this step S105, "2k+x−m+1" is set for the display start address, that is, the pointer SP. Alternatively, if "NO" is decided in the step S105, the CPU 28 sets "1" intact as the pointer SP.

Thus, the display start address, that is, the value of the pointer SP in the step S11 in FIG. 9 is determined.

Figure 11:
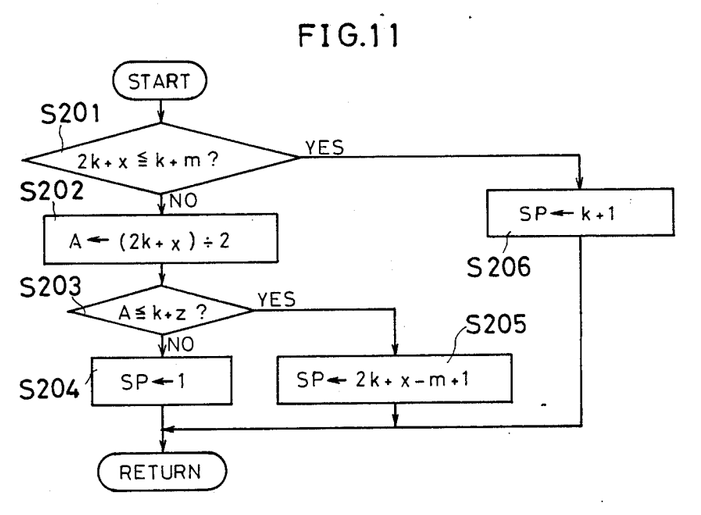

Next, a description of a subroutine for determining the start address in the step S25 in FIG. 9 will be described with reference to FIG. 11. In the first step S201 in FIG. 11, the CPU 28 decides whether or not "2k+x≦k+m" holds. More specifically, in this step S201, decision is made on whether or not the right end column address "2k+x" of the VRAM 30 as shown in FIG. 6(C) is located at the left side from the right end column "k+m" of the CRT area 301.

If "NO" is decided in the step S201, that is, if the state is as shown in FIG. 6(C), the CPU 28 divides the right end column address "2k+x" of the display data stored in the VRAM 30 by two and the result thereof is taken as a variable A in the following step S202. This variable A is loaded in an appropriate working register of the CPU 28. The reason why the address is divided by two is to decide whether the cursor is located at the right half or the left half of the length in the direction of the row of the data.

In the step S203, the CPU 28 decides whether or not "A≦k+z" holds. More specifically in the step S203, the CPU 28 decides whether or not the column address of the cursor is located at the right side from the column address represented by the variable A obtained previously.

When "NO" is decided in the step S203, the CPU 28 sets "1" as the display start address of the VRAM 30, namely, the value of the pointer SP in the step S204. Also, if "YES" is decided in the step S203, the CPU 28 sets "$2k+x-m+1$" as the value of the pointer SP in the step S205. This start address is the position of the pointer SP as shown in FIG. 6C.

Furthermore, in the previous step S201, if "YES" is decided, due to the right end column address of the VRAM 30 being located at the left side from the right end column address of the CRT area 301, the CPU 28 sets "$k+1$" as the display start address, which is the value of the pointer SP in the next step S206. Accordingly, in this case, a part of the formatted document and a part of the menu are displayed on the screen of the CRT 16.

Figure 12:
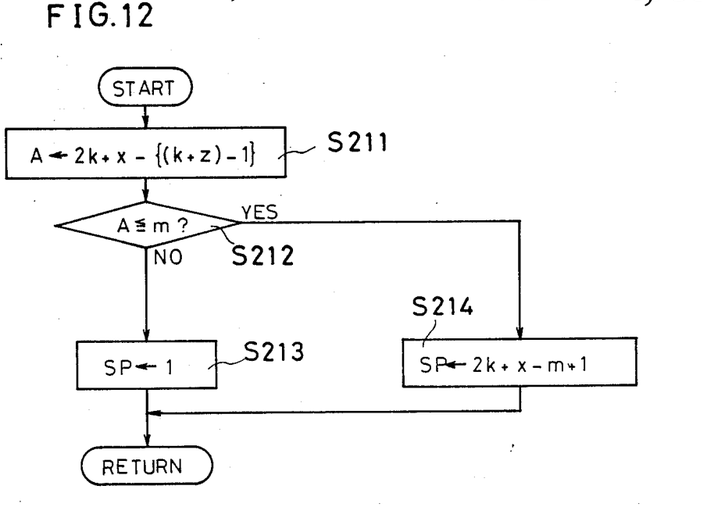
FIG. 12 is a flowchart showing a modified example of FIG. 11.

FIG. 12 is a flowchart showing another example of the subroutine for determining the start address in the step S25 in FIG. 9. In the first step S211 in FIG. 12, the CPU 28 operates "$2k+x-\{(k+z)-1\}$" to evaluate the variable A. In the following step S212, the CPU 28 decides whether or not the column address represented by the variable A is located at the left side from the right end column address m of the CRT area 301. If "NO" is decided in this step S212, the CPU 28 sets "1" as the display start address of the VRAM 30, namely, the value of the pointer SP in the step S213.

If "YES" is decided in the previous step S212, the CPU 28 sets "$2k+x-m+1$" as the pointer SP in the next step S214. A similar result is obtained in the previous step S205 shown in FIG. 11.

Figure 13A:
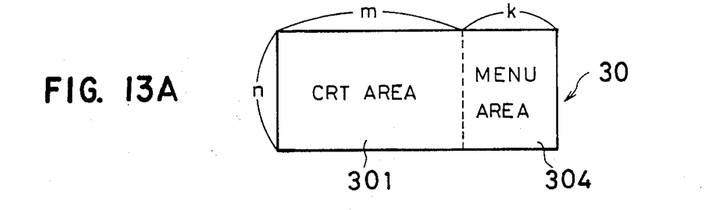
FIGS. 13A, 13B, 13C and 13D comprise an illustrative view showing another example of the memory map of the VRAM.
Figure 13B:
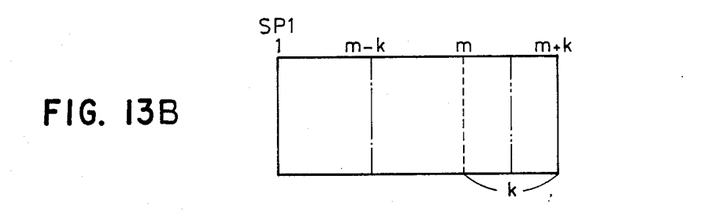

FIGS. 13A, 13B, 13C and 13D (hereafter also referred to collectively as FIG. 13) is an illustrative view showing another example of the memory map of the VRAM 30. In this example, the VRAM 30 is storing a CRT area 301 of m×n, and a menu area 304 of k×n. The formatted document is stored in the CRT area and the menu in the menu area 304, respectively. However, when the length in the direction of the row of the formatted document has an end address located at the left side from the right end column address m of the CRT area 301, the menu can be stored in both a part of the CRT area 301 and a part of the menu area 304 as shown in FIG. 13B.

Figure 13C:
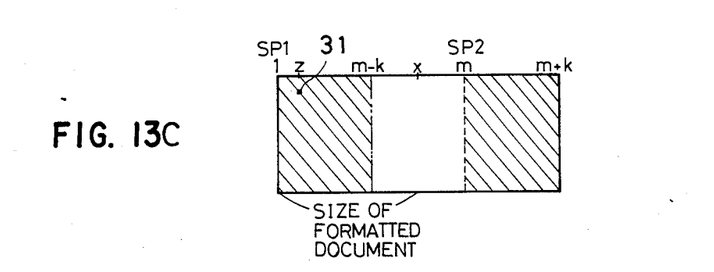
Figure 13D:
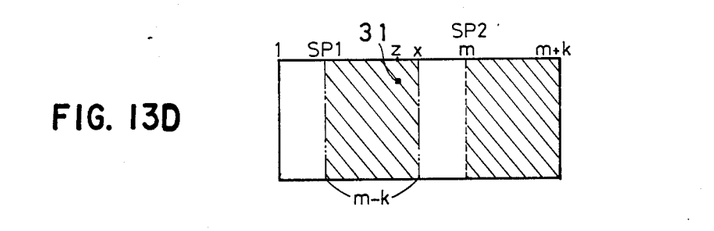
Figure 14:
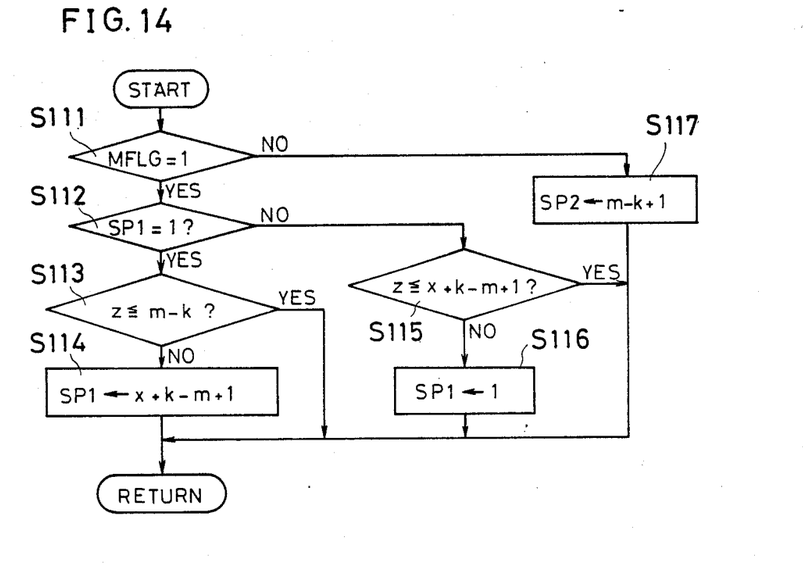
FIG. 14 and FIG. 15 are flowcharts showing one example of a subroutine for determining the display start address in the case of the VRAM having the memory map as shown in FIG. 13.

FIG. 14 is a flowchart showing a subroutine for determining the display start address in the step S11 in FIG. 9 when the VRAM 30 of the memory map as shown in FIG. 13 is employed. In the case where the VRAM 30 has a configuration as shown in FIG. 13 it is necessary to determine two pointers SP1 and SP2 as the pointers.

In the first step S111 in FIG. 14, a decision is made on whether or not the menu flag MFLG is "1". If MFLG=1, the CPU 28 decides whether or not "1" has been set at that time as the display start address, that is, the value of the pointer SP1 in the following step S112. If "YES" is decided in this step S112, the CPU 28 decides whether or not "$z \leq m-k$" holds in the next step S113. That is, in this step S113, a decision is made on whether or not the column address of the cursor is located at the left side from the column address "$m-k$" of the CRT area 301.

If "YES" is decided in the step S113, the CPU 28 sets intact the start address for the formatted document, namely, the value of the pointer SP1 to "1". If "NO" is decided in the step S113, the CPU 28 sets "$x+k-m+1$" as the first pointer SP1 in the next step S114. That is, in this step S114, the CPU 28 sets a certain address which is located at the left side from the column address of the cursor and at the right side from the left end column address.

If "NO" is decided in the previous step S112, the CPU 28 decides whether or not "$z \geq x+k-m+1$" holds in the following step S115. That is, in this step S115, the CPU 28 decides whether or not the cursor 31 is located at the position as shown in FIG. 13D. If "YES" is decided in this step S115, the pointer SP1 for the formatted document is left unchanged. If "NO" is decided in this step S115, the CPU 28 decides that the cursor is located at the position as shown in FIG. 13C at that time, and sets the start address SP1 for the formatted document as "1" in the next step S116.

In the present embodiment, for determining the start address for displaying the menu, the second pointer SP2, "$m-k+1$" is always set in the step S117. That is, the menu is always displayed in a fixed fashion on the right half of the CRT 16.

Figure 15:
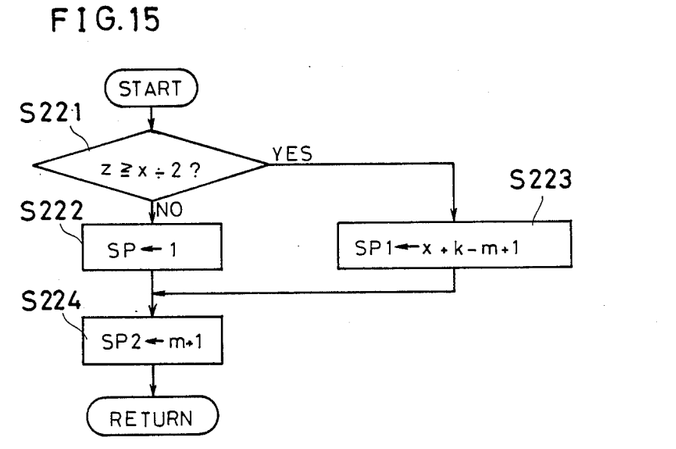

FIG. 15 is a flowchart showing a subroutine for determining the start address in the step S25 of FIG. 9 in the example in FIG. 13. In the first step S221 in FIG. 15, the CPU 28 decides whether or not "$z \geq x+1$" holds. That is, decision is made on whether the column address of the cursor is located at the left half or the right half of the formatted document. If "NO" is decided in the step S221, "1" is set as the pointer SP1 for the formatted document in the step S222. Also, if the cursor is located at the right side from x/2, the CUP 28 sets "$x+k-m+1$" as the first pointer SP1 in the step S223, as in FIG. 13(D).

Accordingly, the start address for displaying the menu, that is, the second pointer SP2, "$m+1$" is always set in the step S224.

Figure 16A:
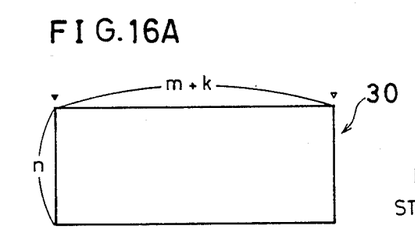
FIGS. 16A, 16B, 16C and 16D comprise an illustrative view showing another example of the memory map of the VRAM.
Figure 16B:
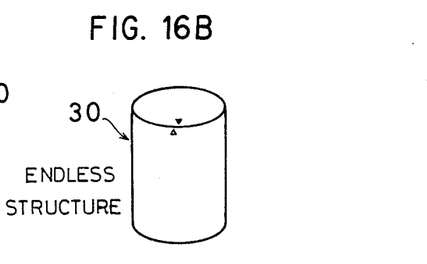
Figure 16C:
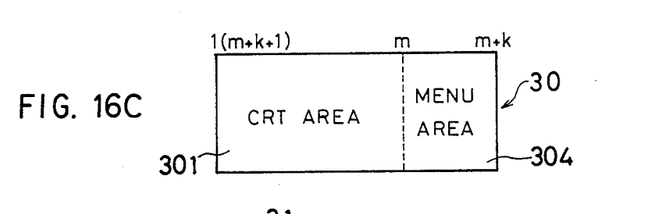
Figure 16D:
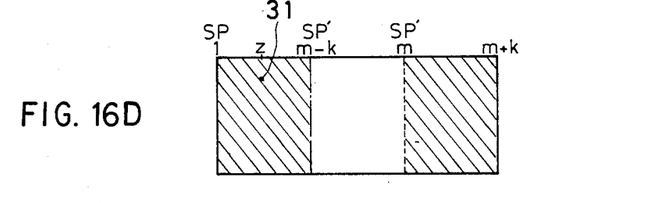

FIGS. 16A, 16B, 16C and 16D (hereafter also referred to collectively as FIG. 16) comprise an illustrative view showing another example of the VRAM. In this example, the VRAM 30 has a size of $(m+k) 10 \times n$, and as shown in FIG. 16(B), it is constituted as an endless structure wherein both ends thereof are jointed.

Figure 17:
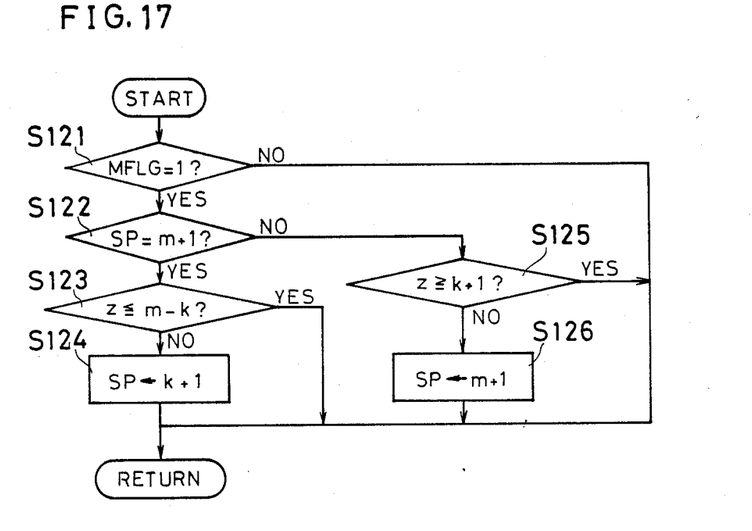
FIG. 17 and FIG. 18 are flowcharts showing one example of a subroutine for determining the display start address in the case of the VRAM having the memory map as shown in FIGS. 16A, 16B, 16C and 16D.

FIG. 17 is a flowchart showing a subroutine for determining the display start address, that is, the value of the pointer in FIG. 9 in the case where the VRAM as shown in FIG. 16 is employed. In the first step S121 in FIG. 17, the CPU 28 decides whether or not the menu flag MFLG is "1". If the menu flag MFLG has been set, the CPU 28 decides whether or not the previously set pointer SP is "$m+1$" in the following step S122. That is, in this step S122, a decision is made on whether or not the start address, namely, the pointer SP is set to the leading address of the menu area 304. If "YES" is decided in the step S122, the CPU 28 decides whether or not "$z \leq m-k$" holds, that is, whether or not the column address of the cursor is in a state as shown in FIG. 16(D) in the next step S123. If "YES" is decided in the step S123, the pointer SP is set intact to "$m+1$". If "NO" is decided, the CPU 28 sets the pointer SP as "$k+1$" in the following step S124. The "$k+1$" means the leading column address of the CRT area 301 because the VRAM 30 consists of an endless structure.

If "NO" is decided in the previous step S122, then the CPU 28 decides whether or not "$z \geq k+1$" holds in the next step S125. If "YES" is decided in this step S125, the pointer SP is kept intact, and if "NO" is decided, the CPU 28 sets "$m+1$" as the pointer SP in the next step S126. Accordingly, in this case, the leading address of the menu area in FIG. 6(D) is set as the display start address. Accordingly the formatted document data other than the part hatched by slant lines in FIG. 6(D) are not displayed on the screen of the CRT 16.

Figure 18:
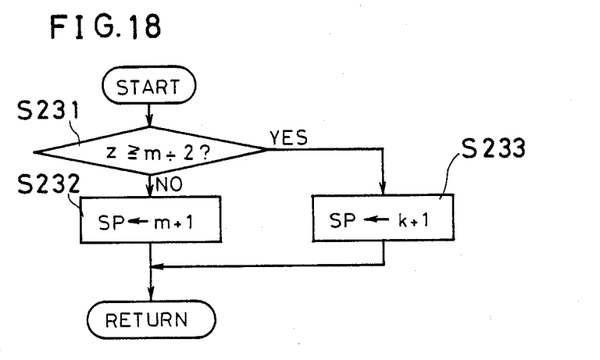

FIG. 18 is a flowchart showing a subroutine for determining the display start address in the step S25 in FIG. 9 in the example of FIG. 16. In the first step S231 in FIG. 18, the CPU 28 decides whether or not "$z \geq m/2$" holds. That is, in this step S231, a decision is made on whether the column address of the cursor 31 is located on the right half or on the left half of the CRT area 301. In step S231, if "NO" is decided, the CPU 28 sets "m+1" as the display start address, that is, the pointer SP in the next step S232. Alternatively, if "YES" is decided, "k+1" is set as the pointer SP.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A display apparatus comprising:
    a display having addresses of n rows by m columns (n and m are positive integers),
    first memory means for storing display data to be displayed on a screen of said display, and having a storage space capable of storing n rows by at least (m+2k) columns (k is a positive integer),
    said first memory means including a document storage area having addresses of n rows by m column for storing display data of a document to be displayed,
    said first memory means including a first menu storage area having addresses of n rows by k columns, for storing display data of a menu to be displayed, said menu storage area being formed in said first memory means adjacent one end of the columns of memory of said document storage area,
    said first memory means further including a second menu storage area for storing display data of a menu, said second menu storage area being formed in said memory means adjacent to the other end of the columns of memory of said document storage area, and having an address of n rows by k columns,
    a cursor address storing means for storing an address for a cursor displayed on said screen of said display,
    start address determining means for determining a start address of said first memory means, said start address being a starting column position in the storage area of said first memory means, based upon a position corresponding to said cursor address stored in said cursor address storing means, from which the data, including the menu data stored in one of said first and second menu storage areas and a part of the document data stored in said document storage area, are read out from said first memory means from said starting column position through columns of one of said first and second menu storage areas, for providing simultaneous display of said cursor, the menu data stored in one of said first and second menu storage areas, and the document data stored in said document storage area having addresses of n rows by (m−k) columns, and
    a means for reading said display data in the address of n rows by m columns of said first memory means so as to begin at said start address determined by said start address determining means, and
    means for converting said display data into a video signal for application to said display.

2. A displaying apparatus in accordance with claim 1, which further comprises:
    second memory means for storing said document data preliminary to conversion into display data,
    third memory means for storing said menu data preliminary to conversion into display data,
    a first commanding means for commanding write of said document,
    a first writing means for (1) converting data of said document of said second memory means into display data in response to a command from said first commanding means, and (2) writing the document display data into said document storage areas of said first memory means,
    a second commanding means for commanding writing of said menu, and
    a second writing means for (1) converting data of said menu of said third memory means into display data in response to a command from said second commanding means, and (2) writing said menu display data into said menu storage areas of said first memory means.

3. A displaying apparatus in accordance with claim 2, further comprising an end address detecting means for detecting an end address x, where x is the most right column of the document data stored in said document storage area of said first memory means in storing the document data into said document storage area by said first writing means.

4. A displaying apparatus in accordance with claim 3, wherein said start address determining means comprises a means for deciding whether or not $2k+x-\{(k+2)-1\} \leq m$ is met when the data length of display data of said document is taken as "x" and the column address of said cursor as "z", and set "$2k+x-m+1$" as said start address when the expression $2k+x-\{(k+2)-1\} \leq m$ is met.

5. A displaying apparatus in accordance with claim 4, wherein said start address determining means sets "1" as said start address when the expression $2k+x-\{(k+2)-1\} \leq m$ is not met.

6. A displaying apparatus in accordance with claim 3, wherein said start address determining means comprises a means for deciding whether or not $2k+x \leq k+m$ is met when the data length of said document is taken as "x", and sets "k+1" as said start address if the expression $2k+x \leq k+m$ is met, wherein the leftmost column of said display is assumed to have a column address of "1" for establishing a point of origin, whereby the column addresses of said display relative to said first and second menu areas being at "k+1" at the left of said display, and end at the display column address "k+m", the one of said first and second menu areas to the left of said display having column addresses from "1" to "k", and the other one of said first and second menu areas having column addresses from "k+m+1" to "2k+m."

7. A displaying apparatus in accordance with claim 6, wherein said start address determining means comprises a means for further deciding whether or not $(2k+x)/2 \leq k+z$ (z is the column address of said cursor) is met when $2k+x \leq k+m$ is not met, and sets "$2k+x-m+1$" as said start address when $(2k+x)/2 \leq k+z$ is met.

8. A displaying apparatus in accordance with claim 7, wherein said start address determining means sets "1" as said start address when the expression $(2k+x)/2 \leq k+z$ is not met.

9. A displaying apparatus, comprising:
a displaying having display addresses of n rows by m columns (n and m are positive integers),
first memory means for storing display data to be displayed on a screen of said display, and having a storage space capable of storing n rows by at least (m+k) columns (k is a positive integer),
said first memory means including a document storage area having addresses of n rows by m columns for storing display data of a document to be displayed,
said first memory means also including a menu storage area having addresses of n rows by k columns, for storing display data of a menu to be displayed, said menu storage area being formed in said first memory means adjacent one end of the columns of memory of said document storage area,
a cursor address storing means for storing a cursor address for a cursor displayed on said screen of said display,
start address determining means, responsive to said cursor address, for determining a starting column position defined by a start address in the storage area of said first memory means, based upon said cursor address,
means for reading said display data in said first memory means, the menu data being read to a predetermined location of said display, the document data stored in said document storage area being read from said first memory means beginning at said start address so that a part of the document data is displayed beginning with the start address, whereby a simultaneous display is provided of said cursor, the menu data stored in said menu storage area, and the document data stored in said document storage area, and
means for converting said display data into a video signal for application to said display.

10. A displaying apparatus in accordance with claim 9, which further comprises:
second memory means for storing said document data preliminary to conversion into display data,
third memory means for storing said menu data preliminary to conversion into display data,
first commanding means for commanding write of said document,
second commanding means for commanding write or said menu,
first writing means for (1) converting data of said document of said second memory means into display data in response to a command from said first commanding means, and (2) writing the document display data into said document storage area of said first memory means, and
second writing means for (1) converting data of said third memory means into display data in response to a command from said second commanding means, and (2) writing said menu display data into said menu storage area of said first memory means.

11. A displaying apparatus in accordance with claim 10, wherein said first memory means comprises a random access memory including an endless structure in which said document and menu storage areas are located so that one end column of said menu storage area is adjacent one end column of said document storage area, and the other end column of said menu storage area is adjacent the other end column of said document storage area.

12. A displaying apparatus in accordance with claim 11, wherein said start address determining means comprises a means for deciding whether or not $z \geq m/2$ is met where the column address of said cursor is taken as "z", said start address determining means setting "k+1" as said start address when the expression $z \geq m/2$ is met.

13. A displaying apparatus in accordance with claim 12, wherein said start address determining means sets "m+1" as said start address when the expression $z \geq m/2$ is not met.

14. A displaying apparatus in accordance with claim 10, further comprising an end address detecting means for detecting an end address x, where x is the most right hand column of the document data stored in said document storage area of said first memory means in storing the document data into said document storage area by said first writing means.

15. A displaying apparatus in accordance with claim 14, wherein said start address determining means includes means for determining the start address for said document and the start for said menu.

16. A displaying apparatus in accordance with claim 15, wherein said start address determining means sets "m+1" as the start address for said menu, said menu storage area being to the right of said document storage area, so that "m+1" represents the address of the column of said menu storage area immediately adjacent said document storage area.

17. A displaying apparatus in accordance with claim 16, wherein said start address determining means comprises a means for deciding whether or not $z \geq x/2$ is met where, the data length of display data of said document is taken as "x" and the address of said cursor as "z", said start address determining means setting "x+k−m+1" as said start address when the expression $z \geq x/2$ is met.

18. A displyaing apparatus in accordance with claim 17, wherein said start address determining means sets "1" as said start address when the expression $z \geq x/2$ is not met.

19. A display apparatus comprising:
a display having addresses arranged in n rows by m columns, with n and m being positive integers;
a memory means including:
a document storage means for storing display data representing a document to be displayed, said document having predefined left and right margins; and
a menu storage means adjacent said document storage means for storing display data representing a menu to be displayed, said menu having predefined left and right margins;
means for storing a cursor address defining the position of a cursor which may be selectively positioned on the display of said document;
means responsive to at least one of the margins of said document and said cursor address for controlling the transfer of data from said memory means to said display, said means for controlling, including means for selecting a starting address of data transferred from said memory means to said display, whereby a portion of the document is transferred to said display beginning with said starting address, the menu data being transferred to an adjacent area of the display, so that the menu and at least a portion of the document appear simultaneously on the display, said portion of the document including said cursor.

20. A display appartaus in accordance with claim 19, wherein said menu storage means is only sufficiently large to store a single copy of said menu and said means for controlling includes meand for providing said menu is a fixed, predetermined position on said display.

21. A display apparatus in accordance with claim 19, wherein said menu storage means comprises first and second menu storage areas, each of a sufficient size to store the entire menu, said first and second menu storage areas being disposed, respectively, ahead of said document storage area and subsequent to said document storage area in said memory means, said selecting means acting to transmit the contents of one of said menu storage areas and said portion of said document to said display, in dependence upon the position of the cursor on said document.

* * * * *